United States Patent [19]

Ekstrand

[11] Patent Number: 5,055,743
[45] Date of Patent: Oct. 8, 1991

[54] INDUCTION HEATED CATHODE

[75] Inventor: John P. Ekstrand, Palo Alto, Calif.

[73] Assignee: Spectra Physics, Inc., Mountain View, Calif.

[21] Appl. No.: 346,469

[22] Filed: May 2, 1989

[51] Int. Cl.$^5$ ............................................... H01J 7/24
[52] U.S. Cl. .................................. 315/111.51; 315/94; 315/111.21; 315/248; 313/339; 313/356
[58] Field of Search ............ 315/94, 105, 248, 111.51, 315/111.21, 111.41, 111.81; 313/337, 339, 356

[56] References Cited

U.S. PATENT DOCUMENTS

| | | | |
|---|---|---|---|
| 2,239,642 | 4/1941 | Burkhardt et al. | 313/356 X |
| 3,509,410 | 4/1970 | Banas et al. | 313/339 X |
| 4,339,691 | 7/1982 | Moriniya et al. | 315/111.41 X |
| 4,812,166 | 3/1989 | Saiki et al. | 315/111.51 X |
| 4,818,916 | 4/1989 | Morrisroe | 315/111.51 X |
| 4,833,294 | 5/1989 | Montaser et al. | 315/111.51 X |

*Primary Examiner*—Eugene R. LaRoche
*Assistant Examiner*—Do Hyun Yoo
*Attorney, Agent, or Firm*—Fliesler, Dubb, Meyer & Lovejoy

[57] ABSTRACT

An improvement for a vacuum tube or a plasma tube comprises a cathode loop formed of a material suitable for induction heating. A support structure mounted inside the vacuum tube supports the cathode loop at a cathode position. A power supply mounted outside the vacuum tube includes an induction coil wrapped around the tube near the cathode position and generates an alternating electromagnetic field at the cathode position to induce heat in the cathode loop so that electrons are released into the vacuum tube. Finally, a DC bias is applied to the cathode through the support structure. The improved plasma tube with an induction heated cathode is particularly useful for an ion laser gain medium.

17 Claims, 1 Drawing Sheet

INDUCTION HEATED CATHODE

BACKGROUND OF THE INVENTION

1. Field of the Invention

The present invention relates to mechanisms for heating cathodes in vacuum tubes or in plasma tubes such as used in ion lasers.

2. Description of Related Art

Plasma tubes used in ion lasers in the prior art have used directly heated AC filament cathodes. These cathodes require a current path to be coupled from the outside of the plasma tube to a filament cathode inside the tube that supports relatively large amount of alternating current. The alternating current induces heat in the cathode due to electrical resistance of the cathode to the current. By heating the cathode, electrons are injected into the plasma tube.

These directly heated filament cathodes are subject of to a variety of problems. For instance, the filaments are quite fragile. The filaments are susceptible to sagging over the lifetime of the tube and may sag into the optical path inside the tube. Also, the mounting posts for these filament cathodes are fragile.

Heavy filament umbilical leads into the plasma tube are required for direct coupled cathodes. The insulated feedthroughs for these leads leak and are complex structures.

The filament transformer for generating the current for directly heated cathodes is large and heavy. The current is not easily regulated using the high current transformers required in these systems. The AC current at frequencies commonly used, such as 60 Hertz, causes vibration of the plasma tube which can degrade the quality of laser beams generated with the plasma tube.

Alternative cathodes have been heated using direct DC current. However, the DC current filaments have current distribution problems which result in uneven heating of the cathode. The uneven heating causes hot spots and premature breakdown.

Accordingly, it is desirable to design a cathode which overcomes many of the problems of directly heated cathodes used in plasma tubes for ion lasers and other gas-discharge or vacuum tube applications.

SUMMARY OF THE INVENTION

The present invention is based on the use of induction heating for cathodes. Basically, a ring cathode is mounted within the plasma tube, and a primary heating coil wrapped around the outside of the tube adjacent the cathode. A solid state regulated energy source drives the primary heating coil to induce an electromagnetic field at the cathode. The field causes induction heating. Thus, the invention eliminates many of the problems of the prior art, including fragile filaments, complex feedthroughs for high currents into the cathode, and regulation of a power supply suitable for direct resistive heating.

Accordingly, in one aspect, the present invention provides an improvement for a tube with a first end and a second end in which a cathode is mounted adjacent the first end and an anode mounted adjacent the second end. The improvement comprises a cathode loop formed of a material suitable for induction heating. A support structure mounted inside the tube supports the cathode loop at a cathode position adjacent the first end. An induction power supply is mounted outside the tube near the cathode position and generates an alternating electromagnetic field at the cathode position to induce current to heat the cathode loop so that electrons are released into the tube. Finally, a DC bias is applied to the cathode through the support structure.

According to a second aspect, the present invention provides an improvement for an ion laser having a plasma tube with a first end and a second end supporting a cavity mode within the plasma tube. The cathode comprising a cathode loop is made of a material suitable for induction heating. The cathode loop is supported inside the plasma tube of the laser at a cathode position adjacent the first end by means of an at least one electrically conductive structural member bonded to the first end of the plasma tube and to the cathode loop. An induction power source generates an alternating electromagnetic field at the cathode position to induce heat in the cathode loop so that electrons are released into the plasma tube to support laser gain. Finally, a DC bias relative to the anode is supplied to the cathode loop through the structural member.

Other aspects and advantages of the present invention can be determined upon review of the figures, detailed description, and claims which follow.

DETAILED DESCRIPTION

A detailed description of preferred embodiments of the present invention is provided with reference to the figures.

Figure 1:
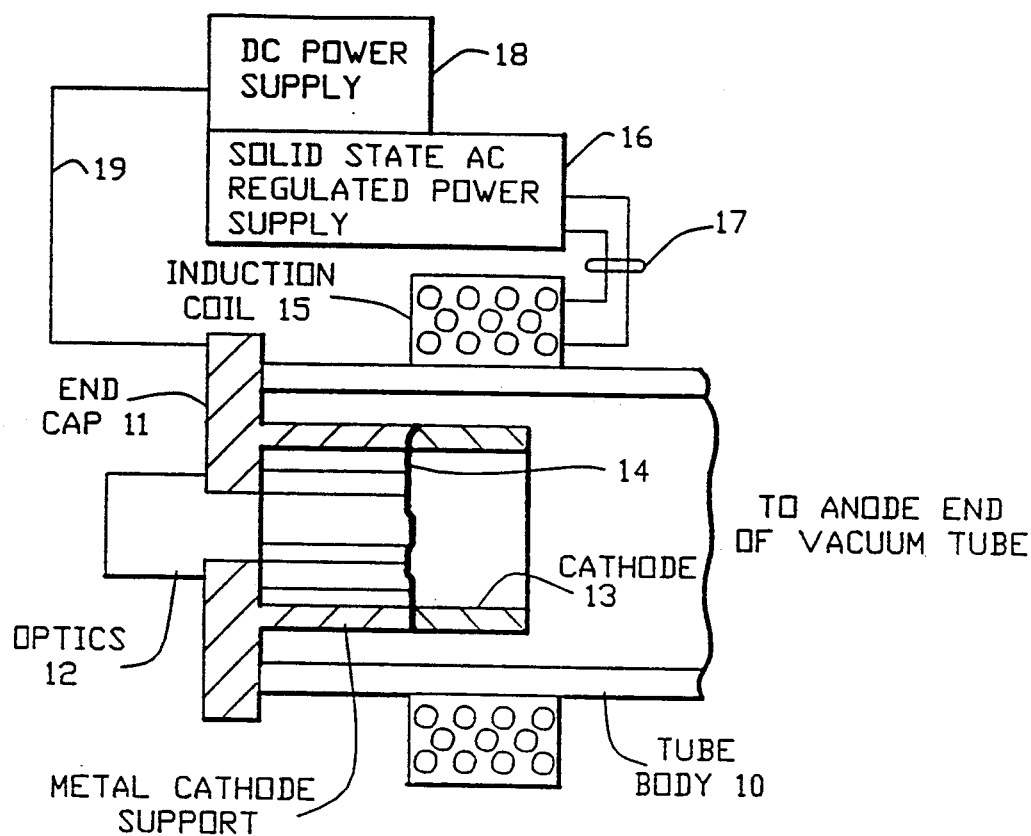
FIG. 1 is a cross-sectional view of a cathode end of an ion laser plasma tube with an induction heated cathode according to the present invention.

FIG. 1 provides a cross-sectional and schematic view of the cathode end of a ion laser. The ion laser comprises a tube body 10 which is sealed with an end cap 11. The tube body is ceramic or glass. The end cap, according to the preferred embodiment, is manufactured of an electrically conductive, structural material, such as an iron nickel alloy. For the laser application, the laser optics 12, such as a high reflecting mirror or an output coupler, are mounted on the end cap 11. A cathode 13 is supported at a cathode position within the tube body 10 by a plurality of structural members 14. At least one of the structural members is formed of an electrically conductive material. The structural members in the embodiment shown in FIG. 1 are formed of a single piece with the end cap 11. Thus, an electrically conductive path is formed from the end cap through the structural member 14 to the cathode 13.

The cathode 13 is formed of a material such as used commonly for dispenser cathodes in the prior art, like barium impregnated tungsten. The tungsten cathode 13 is bonded to the nickel iron alloy of the structural members using well known techniques.

An induction coil 15 is wrapped around the tube body 10 near the cathode position. A solid state AC regulated power supply 16 is coupled across lines 17 to the induction coil 15. The regulated power supply 16 supplies an AC current to the induction coil 15 at a regulated current and frequency. An electromagnetic field is induced at the cathode position inside the tube body which induces heat in the cathode. By heating the cathode, electrons are released into the tube body to support plasma gain medium of the ion laser. A DC bias power supply 18 is coupled across line 19 to the end cap 11 to supply the cathode with a DC bias relative to the anode.

The induction frequency of the solid state AC regulated power supply 16 is selected so that vibrations of the tube body are minimized. Thus, the induction frequency will typically be in the radio frequency range.

Further, the power supply 16 can be controlled in response to the temperature of the cathode 13. Using the induction heated cathode, as illustrated in FIG. 1, the temperature of the cathode ca be sensed by measuring the Q of the transformer formed by the induction coil and the cathode. The resistance of the cathode will change with temperature at about 0.4% per degree Celsius. As the resistance changes, the Q of the circuit will change. In response to changes in Q of the circuit, the output of the power supply can be controlled to regulate the temperature of the cathode.

Figures 2, 3:
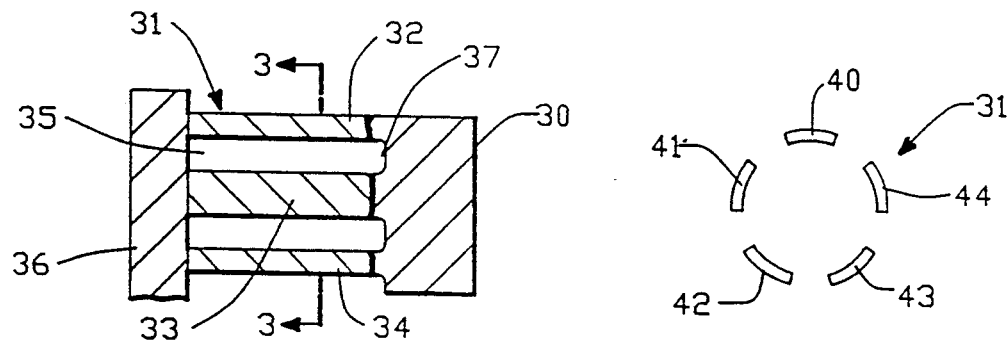
FIG. 2 is a perspective view of the cathode with a structural support member.
FIG. 3 is a cross-sectional view taken at the lines 3—3 of FIG. 2 of the structural support member for the cathode.

FIG. 2 is a drawing of the cathode and structural support members according to one embodiment of the present invention. It can be seen that the cathode 30 is a tubular member which provides a conductive path around the complete circumference of the tube to form a cathode loop. The cathode support structure 31 is made up of a plurality of structural members 32, 33, and 34 shown in FIG. 2. Thus, slots, such as slot 35, are formed in the structural member 31. This tends to interrupt induction currents in the structural member and prevent heating of the structural member 31. The structural member 31 in the embodiment of FIG. 2 is bonded to the end cap 36 using techniques suitable for the respective materials.

Also shown in FIG. 2, the tubular member 30 of the cathode has slots (e.g. slot 37) cut on a first end of the tube which match the slots 35 in the structural member. This decreases the induction heating at the bond between the structural member and the cathode tube 30 to minimize stress on that bond.

FIG. 3 is a cross-sectional view taken at the line 3—3 of the support structure 31 shown in FIG. 2. It can be seen that the support structure 31 includes five structural members 40, 41, 42, 43 and 44. Each of the structural members is formed of electrically conductive material through which the DC bias can be applied. Of course, any number of structural members can be used for a particular application.

Figure 4:
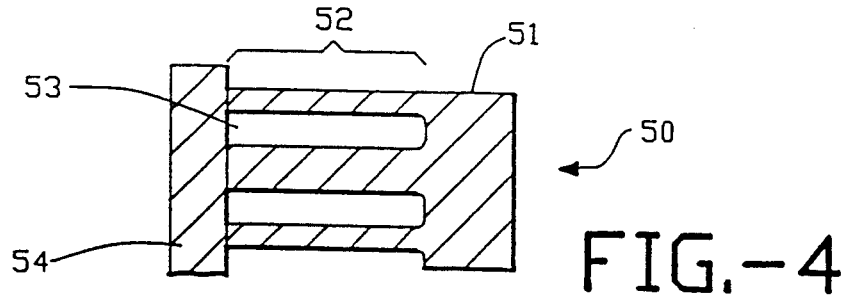
FIG. 4 is an alternative embodiment of the cathode and structural support member according to the present invention.

FIG. 4 is an alternative embodiment of the cathode 50 according to the present invention. In the embodiment of FIG. 4, the cathode is formed of the tubular member 51 and a support structure 52. The tubular member 51 and the support structure 52 are formed of a single piece of material. The support structure includes slots (e.g. slot 53) to interrupt induction heating of the support structure 52. The cathode 51 portion of the single piece of material is formed so that a continuous current loop can proceed around the circumference of the tube to optimize the induction heating. The tubular member 51 is bonded to the end cap 54 using techniques adapted to the particular materials used.

The embodiment shown in FIG. 1 is adapted for use with an ion laser. Obviously, the induction heated cathode can be used in any vacuum tube or plasma tube technology.

The induction heated cathode has many advantages over prior art systems. First, only a DC physical electrical connection is required inside the plasma tube of the cathode. This DC connection can be relatively low current and can be supplied through the structural members of the plasma tube rather than requiring a current feedthrough. Furthermore, the mounting for the cathode can be more rugged than in the filament cathode embodiments of the prior art.

The electronics used in the induction heated cathode do not require a 60 Hertz transformer because energy is directly coupled into the filament from the induction loop. Further, the power may be electronically regulated, allowing for smaller, lighter-weight, higher quality source. In addition, the tubular or ring filament for induction heated cathodes is much more rugged than the direct heated cathodes which must have small cross-sectional dimensions to cause sufficient resistive heating at reasonable current levels.

For laser applications, the elimination of the 60 Hertz transformer will eliminate that source of vibration of the mirror plates. Finally, there are no insulated feedthroughs into the plasma tube required for an induction heated cathode according to the present invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is

1. For a tube with a first end and a second end, a cathode mounted adjacent the first end and an anode mounted adjacent the second end, an improvement comprising:
   the cathode comprising a cathode loop of a first material suitable for induction heating;
   means, mounted inside the tube, for supporting the cathode loop inside the tube at a cathode position adjacent the first end;
   means, mounted outside the tube near the cathode position, for generating an alternating electromagnetic field at the cathode position to induce current, producing heat in the cathode loop so that electrons are released into the tube; and
   means, mounted with the means for supporting, for providing DC bias relative to the anode on the cathode loop.

2. The improvement of claim 1, wherein the first end of the tube comprises an end cap formed of electrically conductive structural material, and
   the means for supporting the cathode loop comprises at least one electrically conductive structural member having a first end and a second end, the structural member coupled to the end cap at the first end and coupled to the cathode loop at the second end, and wherein the means for supplying DC bias is connected to the end cap so that DC current is supplied to the cathode loop through the end cap and the structural member of the means for supporting.

3. The improvement of claim 1, wherein the cathode loop comprises a tubular member.

4. The improvement of claim 1, wherein the means for supporting the cathode loop comprises at least one electrically conductive structural member having a first end and a second end, the structural member coupled to the tube at the first end and coupled to the cathode loop at the second end, and wherein the cathode loop and structural member are formed of a single piece of material, and wherein
 the means for supplying DC bias is connected to the structural member so that DC current is supplied to the cathode loop through the structural member of the means for supporting.

5. The improvement of claim 1, wherein the means for supporting the cathode loop comprises at least one electrically conductive structural member having a first end and a second end, the structural member coupled to the tube at the first end and coupled to the cathode loop at the second end, and wherein the structural member comprises an electrically conductive material and is bonded to the cathode loop, and wherein
 the means for supplying DC bias is connected to the structural member so that DC current is supplied to the cathode loop through the structural member of the means for supporting.

6. The improvement of claim 1, wherein the means for generating comprises an induction coil wrapped around the tube and a regulated AC power supply coupled to the induction coil supplying power at an induction frequency.

7. The improvement of claim 6, wherein the induction frequency is greater than 60 Hz.

8. For an ion laser having a plasma tube with a first end and a second end supporting a cavity mode within the plasma tube, a cathode mounted adjacent the first end and an anode mounted adjacent the second end, an improvement comprising:
 the cathode comprising a cathode loop having a passage therethrough and comprising a material suitable for induction heating;
 means, mounted inside the plasma tube, for supporting the cathode loop inside the plasma tube at a cathode position adjacent the first end so that the cavity mode at the cathode position lies inside the passage in the cathode loop, the means for supporting including at least one electrically conductive structural member having a first end and a second end, the structural member coupled to the plasma tube at the first end and coupled to the cathode loop at the second end;
 means, mounted outside the plasma tube near the cathode position, for generating an alternating electromagnetic field at the cathode position to induce heat in the cathode loop so that electrons are released into the plasma tube; and
 means, coupled to the structural member, for providing DC bias relative to the anode on the cathode loop through the structural member.

9. The improvement of claim 8, wherein the first end of the plasma tube comprises an end cap formed of electrically conductive structural material, and
 the structural member is coupled to the end cap at the first end, and wherein
 the means for supplying DC bias is connected to the end cap so that DC current is supplied to the cathode loop through the end cap and the structural member.

10. The improvement of claim 8, wherein the cathode loop and the structural member are formed of a single piece of material.

11. The improvement of claim 8, wherein the structural member comprises an electrically conductive material and is bonded to the cathode loop at the second end.

12. The improvement of claim 8, wherein the means for generating comprises an induction coil wrapped around the plasma tube and a regulated AC power supply coupled to the induction coil supplying power at an induction frequency.

13. The improvement of claim 12, wherein the induction frequency is greater than 60 Hz.

14. For an ion laser having a plasma tube with a first end and a second end supporting a cavity mode within the plasma tube, a cathode mounted adjacent the first end and an anode mounted adjacent the second end, an improvement comprising:
 the cathode comprising a tubular member having a passage therethrough formed of a material suitable for induction heating;
 the first end of the plasma tube comprises an end cap formed of electrically conductive structural material,
 means, mounted inside the plasma tube on the end cap, for supporting the tubular member inside the plasma tube at a cathode position adjacent the first end so that the cavity mode at the cathode position lies inside the passage in the tubular member, the means for supporting including at least one electrically conductive structural member having a first end and a second end, the structural member coupled to the end cap of plasma tube at the first end and coupled to the tubular member at the second end;
 an induction coil wrapped around the plasma tube and a regulated AC power supply coupled to the induction coil supplying power at an induction frequency for generating an alternating electromagnetic field at the cathode position to induce heat in the tubular member so that electrons are released into the plasma tube; and
 means, coupled to the end cap, for providing DC bias relative to the anode on the tubular member through the end cap and the structural member.

15. The improvement of claim 14, wherein the tubular member and the structural member are formed of a single piece of material.

16. The improvement of claim 14, wherein the structural member comprises an electrically conductive material and is bonded to the tubular member at the second end.

17. The improvement of claim 14, wherein the induction frequency is greater than 60 Hz.

* * * * *